(12) United States Patent
Mitobe

(10) Patent No.: US 9,869,985 B2
(45) Date of Patent: Jan. 16, 2018

(54) CONTROL DEVICE, IMAGE FORMING APPARATUS, AND CONTROL METHOD

(71) Applicant: FUJI XEROX CO., LTD., Tokyo (JP)

(72) Inventor: Yasuaki Mitobe, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 267 days.

(21) Appl. No.: 14/926,663

(22) Filed: Oct. 29, 2015

(65) Prior Publication Data
US 2016/0349727 A1 Dec. 1, 2016

(30) Foreign Application Priority Data
Jun. 1, 2015 (JP) ................. 2015-111518

(51) Int. Cl.
G05B 19/042 (2006.01)
G03G 15/00 (2006.01)

(52) U.S. Cl.
CPC ..... *G05B 19/0421* (2013.01); *G03G 15/5087* (2013.01); *G03G 2215/00109* (2013.01)

(58) Field of Classification Search
CPC ........... G05B 19/0421; G03G 15/5087; G03G 2215/00109
USPC .............................................................. 700/3
See application file for complete search history.

(56) References Cited

U.S. PATENT DOCUMENTS

| 4,283,773 A * | 8/1981 | Daughton | G03G 21/14 700/3 |
|---|---|---|---|
| 9,013,731 B2 * | 4/2015 | Yoshida | G06F 3/1296 358/1.1 |
| 9,201,623 B2 * | 12/2015 | Yoshida | G06F 3/1296 |
| 9,578,196 B2 * | 2/2017 | Mitobe | H04N 1/00915 |
| 2009/0019203 A1 * | 1/2009 | Lee | H04N 1/32561 710/260 |

FOREIGN PATENT DOCUMENTS

JP 2014-003377 A 1/2014

* cited by examiner

*Primary Examiner* — Miranda Huang
*Assistant Examiner* — Sivalingam Sivanesan
(74) *Attorney, Agent, or Firm* — Oliff PLC

(57) ABSTRACT

A control device includes a second sub-controller to which second devices are connected, a first sub-controller to which first devices are connected, a master controller that controls the first and second sub-controllers, and so on. The second sub-controller includes a second interruption information memory storing second interruption information output from the second devices, a second interruption controller transmitting an interruption signal upon storing of the second interruption information and transmitting the second interruption information, and a synchronization signal generator transmitting a synchronization signal that is synchronous with the interruption signal. The first sub-controller includes a first interruption information memory storing first interruption information output from the first devices and the second interruption information, a first interruption controller transmitting the interruption signal and transmitting the first and second interruption information, and a synchronization signal controller controlling a storage operation of the first interruption information memory in accordance with the synchronization signal.

12 Claims, 7 Drawing Sheets

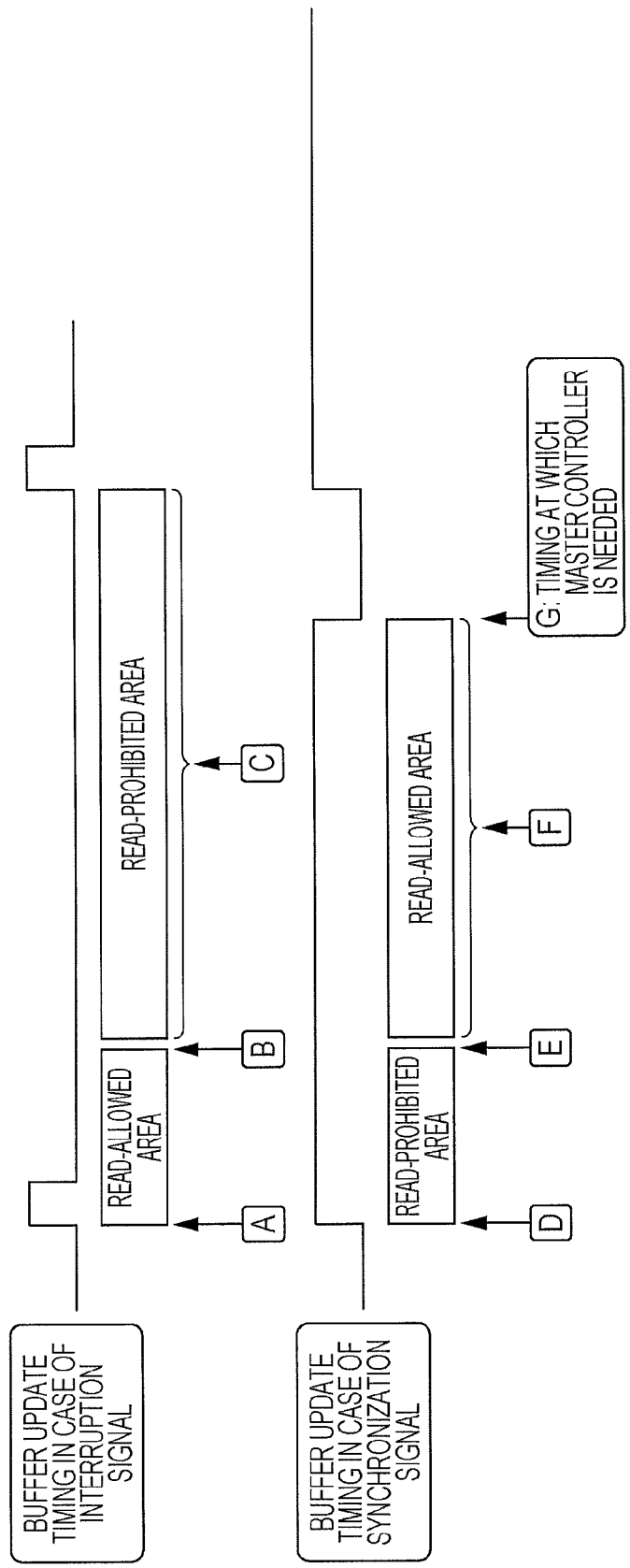

CONTROL DEVICE, IMAGE FORMING APPARATUS, AND CONTROL METHOD

CROSS-REFERENCE TO RELATED APPLICATIONS

This application is based on and claims priority under 35 USC 119 from Japanese Patent Application No. 2015-111518 filed Jun. 1, 2015.

BACKGROUND

Technical Field

The present invention relates to a control device, an image forming apparatus, and a control method.

SUMMARY

According to an aspect of the invention, there is provided a control device including a second sub-controller, a first sub-controller, a master controller, a full-duplex serial bus, a full-duplex serial or parallel bus, and unidirectional transmission lines. To the second sub-controller, one or more second devices are connected. The second sub-controller includes a second interruption information memory that stores second interruption information output from the second devices, a second interruption controller that transmits an interruption signal upon storing of the second interruption information in the second interruption information memory, and reads and transmits the second interruption information stored in the second interruption information memory, and a synchronization signal generator that transmits a synchronization signal which is synchronous with the interruption signal. To the first sub-controller, one or more first devices are connected. The first sub-controller includes a first interruption information memory that stores first interruption information output from the first devices, and the second interruption information transmitted from the second sub-controller, a first interruption controller that transmits the interruption signal received from the second sub-controller, and reads and transmits the first interruption information and the second interruption information stored in the first interruption information memory, and a synchronization signal controller that controls a storage operation of the first interruption information memory in accordance with the synchronization signal. The master controller controls the first sub-controller and the second sub-controller. The full-duplex serial bus connects the master controller and the first sub-controller to each other. The full-duplex serial or parallel bus connects the first sub-controller and the second sub-controller to each other. One of the unidirectional transmission lines is used to transmit the interruption signal from the second sub-controller to the first sub-controller. The other of the unidirectional transmission lines is used to transmit the synchronization signal from the second sub-controller to the first sub-controller.

BRIEF DESCRIPTION OF THE DRAWINGS

An exemplary embodiment of the present invention will be described in detail based on the following figures, wherein:

FIG. 8 is a timing chart illustrating the operation of the control device according to the exemplary embodiment of the present invention.

DETAILED DESCRIPTION

Hereinafter, an exemplary embodiment of the present invention will be described with reference to the drawings.

Figure 1:
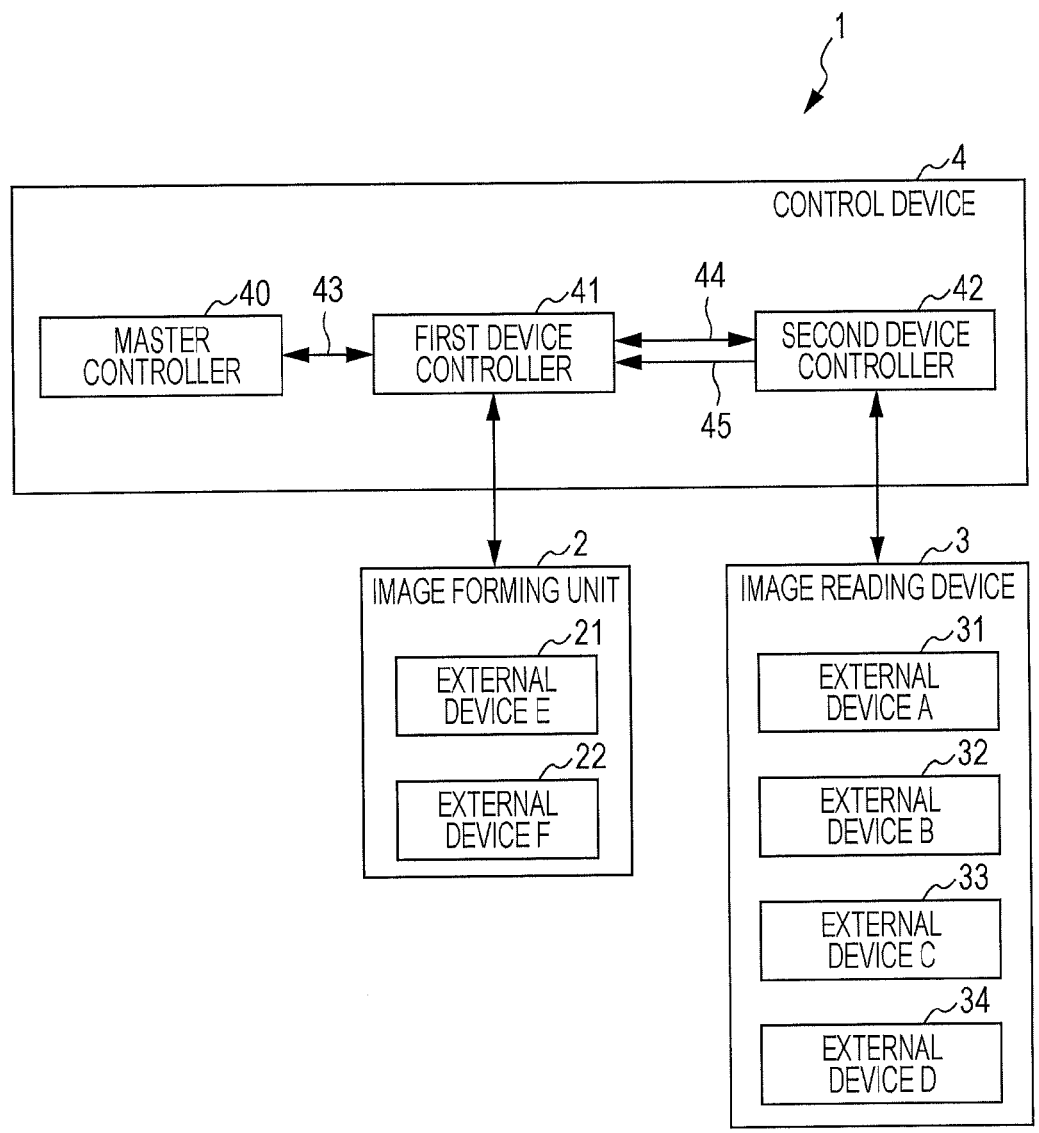
FIG. 1 is a block diagram illustrating an image forming apparatus to which a control device according to an exemplary embodiment of the present invention is applied.

FIG. 1 is a block diagram illustrating an overview of an image forming apparatus to which a control device according to an exemplary embodiment of the present invention is applied.

Overall Configuration of Image Forming Apparatus

An image forming apparatus 1 according to this exemplary embodiment is configured as a color copier, for example. As illustrated in FIG. 1, the image forming apparatus 1 includes an image reading device 3 that reads an image of a document, an image forming unit 2 that is an example of an image forming section and that forms an image on a recording medium on the basis of image data of the document, an image of which is read by the image reading device 3, or on the basis of image data transmitted from an external host apparatus, such as a personal computer, and a control device 4 that controls the image reading device 3 and the image forming unit 2.

The image forming unit 2 includes one or more first external devices (devices), such as a first external device 21 and a first external device 22 (external devices E and F in FIG. 1 and FIG. 2, hereinafter also referred to as external devices 21 and 22). The first external device 21 is constituted by at least one driving motor that drives a photoconductor drum, a developing device, a sheet conveying device, a secondary transfer device, a fixing device, or the like. The first external device 22 is constituted by at least one sheet sensor that detects a recording sheet, which is an example of a recording medium. The image forming unit 2 is not limited to a unit that forms an image on the basis of an electrophotographic method using a photoconductor drum or the like, and may be a unit that forms an image on the basis of another method, such as an inkjet method.

The image reading device 3 includes one or more second external devices (devices), such as a second external device 31, a second external device 32, a second external device 33, and a second external device 34 (external devices A to D in FIG. 1 and FIG. 2, hereinafter also referred to as external devices 31 to 34). The second external device 31 is constituted by a driving motor that drives a document conveying mechanism formed of a feed roller and a separating roller that feed documents, plural conveying rollers that convey documents to a document read position, and an ejecting roller that ejects documents. The second external device 32 is constituted by a driving motor that drives a carriage (movable body) equipped with an image reading element and a mirror. The second external device 33 is constituted by the image reading element that reads an image of a document. The second external device 34 is constituted by an image processing apparatus that performs necessary image processing on image data of a document, an image of which is read by the second external device 33, and generates data of an image to be formed by the image forming unit 2.

The control device 4 controls a read operation of reading an image of a document and an image processing operation which are performed by the image reading device 3, an image forming operation of forming an image on a recording medium which is performed by the image forming unit 2, and the like.

The control device 4 includes a first device controller 41 that controls the image forming unit 2 and that is an example of a first sub-controller, a second device controller 42 that controls the image reading device 3 and that is an example of a second sub-controller, and a master controller 40 that controls both the first device controller 41 and the second device controller 42, as illustrated in FIG. 1. The master controller 40 and the first device controller 41 are connected to each other via a full-duplex serial bus 43. As illustrated in FIG. 2, the serial bus 43 is a full-duplex transmission line that includes a signal line Tx for transmission and a signal line Rx for reception when seen from the master controller 40. The first device controller 41 and the second device controller 42 are connected to each other via a full-duplex serial bus 44 (or a parallel bus). In this exemplary embodiment, the first device controller 41 and the second device controller 42 are connected to each other via the full-duplex serial bus 44. Further, the control device 4 is provided with a signal line 45 that serves as a unidirectional transmission line for transmitting an interruption signal described below from the second device controller 42 to the first device controller 41. Further, the control device 4 is provided with a signal line 49 that serves as a unidirectional transmission line for transmitting a synchronization signal described below from the second device controller 42 to the first device controller 41. As described above, the first device controller 41 is firstly connected to the master controller 40 via the serial bus 43 (hereinafter referred to as "first connection"). On the other hand, the second device controller 42 is secondly connected to the first device controller 41 that is firstly connected to the master controller 40, via the serial bus 44 (hereinafter referred to as "second connection").

Figure 2:
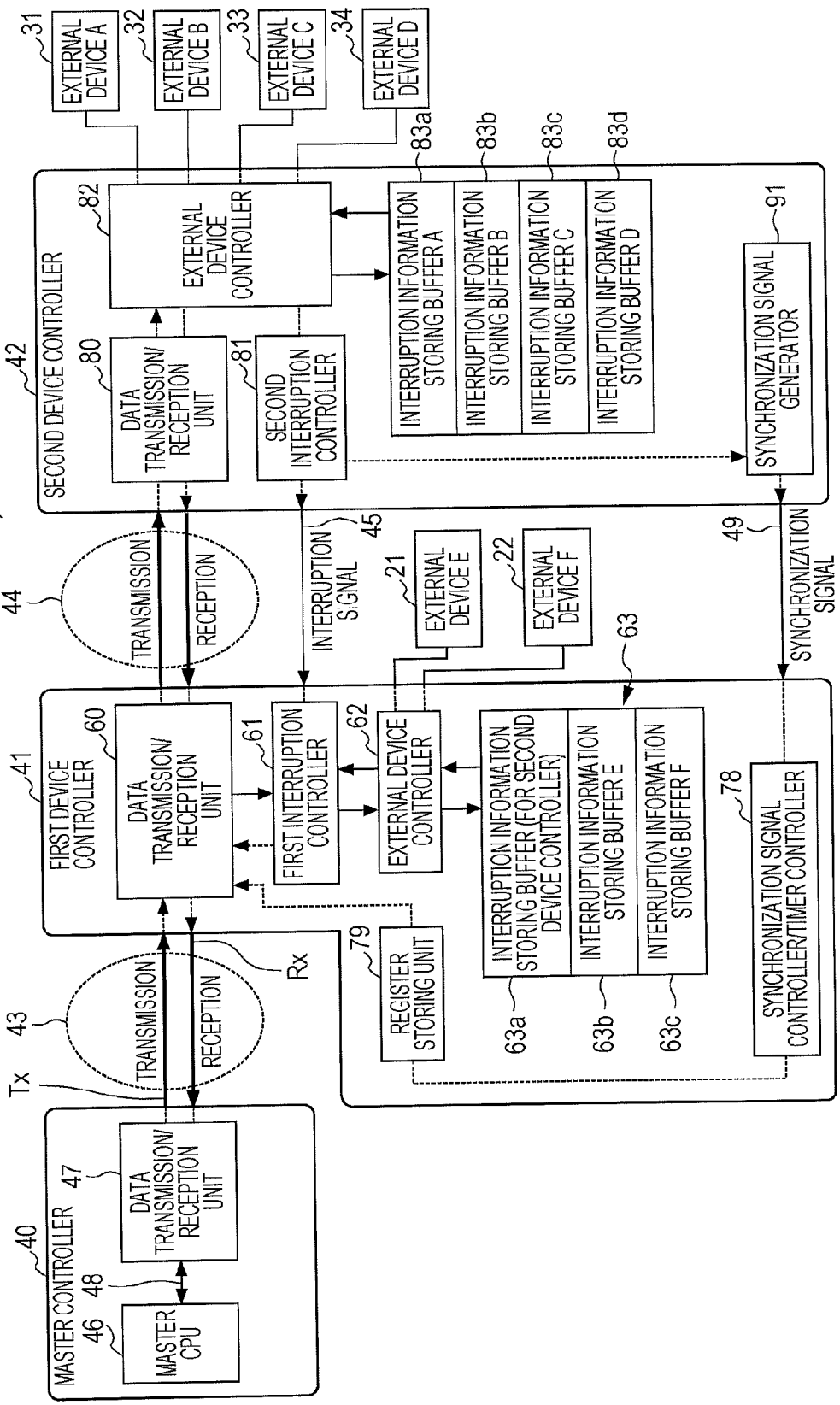
FIG. 2 is a block diagram illustrating the control device according to the exemplary embodiment of the present invention.

The master controller 40 includes a master central processing unit (CPU) 46, which is an example of a control section, and a data transmission/reception unit 47, as illustrated in FIG. 2. The master CPU 46 entirely controls the image forming unit 2 and the image reading device 3 in accordance with a program while referring to data stored in a random access memory (RAM) or the like not illustrated. Note that the program executed by the master CPU 46 may be a program stored in advance in a read-only memory (ROM) not illustrated, such as a hard disk drive (HDD), a flexible disc, a digital versatile disc (DVD), a magneto-optical disc, a universal serial bus (USB) memory, or the like not illustrated, or may be a program transmitted from another apparatus that is connected via a communication interface not illustrated and thereafter stored in a ROM.

The master CPU 46 is connected to the data transmission/reception unit 47 via a CPU bus 48. The CPU bus 48 is a parallel bus that includes plural signal lines.

When the data transmission/reception unit 47 receives, from the master CPU 46 via the CPU bus 48, a control signal that is formed of a parallel signal and that is to be transmitted to the first device controller 41 and the second device controller 42, the data transmission/reception unit 47 separates the control signal into packets in accordance with a predetermined rule, converts the packets into a serial signal, and transmits the serial signal to the first device controller 41 via the serial bus 43. When the data transmission/reception unit 47 receives packets in a serial format from the first device controller 41 via the serial bus 43 or from the second device controller 42 via the serial bus 43 and the serial bus 44, the data transmission/reception unit 47 converts the received packets into packets in a parallel format, decodes the packets in a parallel format, and extracts data contained in the packets.

Figure 3:
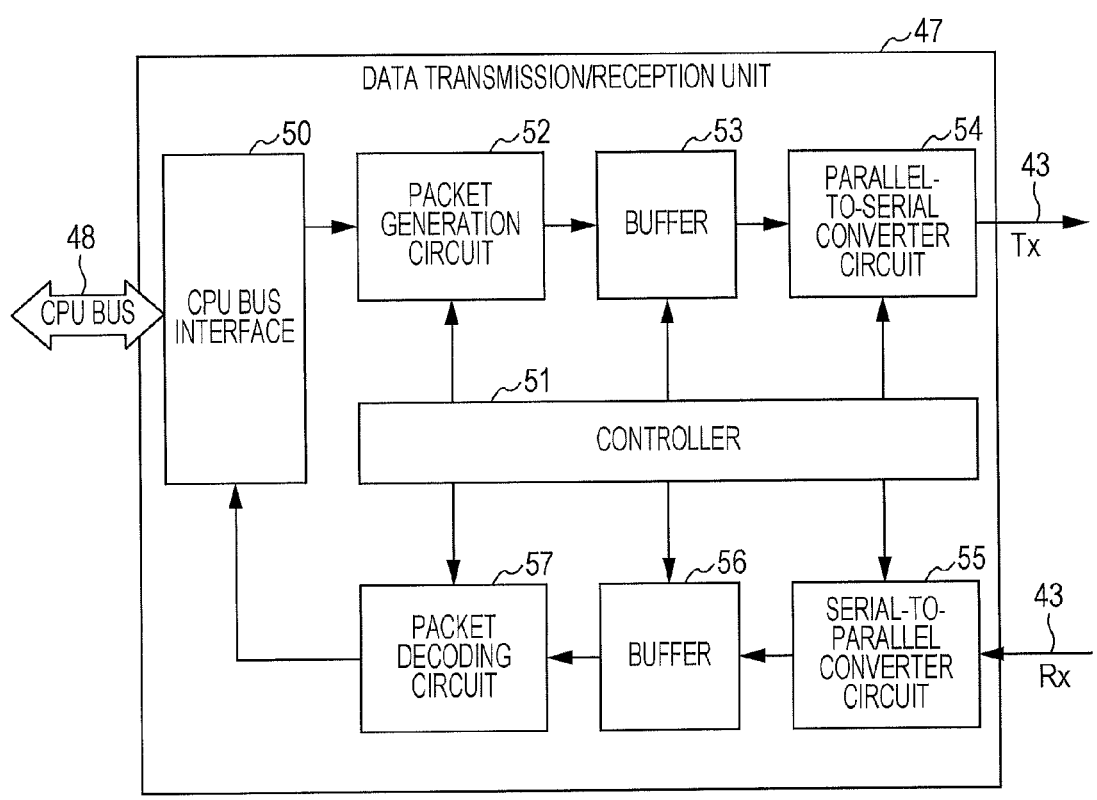
FIG. 3 is a block diagram illustrating a data transmission/reception unit of a master controller.

As illustrated in FIG. 3, the data transmission/reception unit 47 includes a CPU bus interface 50, a controller 51, a packet generation circuit 52, a buffer 53, a parallel-to-serial converter circuit 54, a serial-to-parallel converter circuit 55, a buffer 56, and a packet decoding circuit 57.

The CPU bus interface 50 is a communication interface for communicating with the master CPU 46 via the CPU bus 48 that is formed of a parallel bus. The controller 51 is connected to the packet generation circuit 52, the buffer 53, the parallel-to-serial converter circuit 54, the serial-to-parallel converter circuit 55, the buffer 56, and the packet decoding circuit 57 that constitute the data transmission/reception unit 47, and entirely controls the data transmission/reception unit 47 by performing protocol control or controlling operation timings and the like of the above-described constituent components.

The packet generation circuit 52 generates packets in accordance with a predetermined rule on the basis of a control signal transmitted from the master CPU 46. The buffer 53 temporarily stores the packets generated by the packet generation circuit 52. The parallel-to-serial converter circuit 54 converts the packets in a parallel format temporarily stored in the buffer 53 into packets in a serial format, and transmits the packets to the first device controller 41 via the serial bus 43. Here, the packets that are transmitted to the first device controller 41 include packets to be transmitted to the second device controller 42.

On the other hand, the serial-to-parallel converter circuit 55 converts packets in a serial format received from the first device controller 41 via the serial bus 43 into packets in a parallel format. Here, the packets received from the first device controller 41 include packets transmitted from the second device controller 42. The buffer 56 temporarily stores the packets in a parallel format converted by the serial-to-parallel converter circuit 55. The packet decoding circuit 57 decodes the packets in a parallel format temporarily stored in the buffer 56, and extracts data (including interruption information) contained in the packets. The data output from the packet decoding circuit 57 is transmitted to the CPU bus interface 50.

The first device controller 41 includes a data transmission/reception unit 60, a first interruption controller 61, an external device controller 62, plural interruption information storing buffers 63a to 63c (hereinafter also referred to as interruption information storing buffers 63), which are examples of a first interruption information memory, a synchronization signal controller/timer controller 78, and a register storing unit 79, as illustrated in FIG. 2.

When the data transmission/reception unit 60 receives packets in a serial format from the master controller 40 via the serial bus 43, the data transmission/reception unit 60 converts the received packets into packets in a parallel format, decodes the packets in a parallel format, and extracts data contained in the packets. The data transmission/reception unit 60 separates information (parallel signal) to be transmitted to the master controller 40 and the second device controller 42 into packets, converts the packets into a serial signal, and transmits the serial signal to the master controller 40 via the serial bus 43 and to the second device controller 42 via the serial bus 44. Further, when the data transmission/reception unit 60 receives packets in a serial format from the second device controller 42 via the serial bus 44, the data transmission/reception unit 60 converts the received packets into packets in a parallel format, decodes the packets in a parallel format, and extracts data contained in the packets.

The first interruption controller 61 receives an interruption signal input from the second device controller 42 via the signal line 45, and controls an interruption process on the basis of the interruption signal.

The interruption information storing buffers 63 constitute the first interruption information memory and temporarily store first interruption information output from the external devices 21 and 22 of the image forming unit 2 and second interruption information transmitted from the second device controller 42. The interruption information storing buffers 63 include the interruption information storing buffer 63*a* for (dedicated to) the second device controller which stores the second interruption information transmitted from the second device controller 42, and the interruption information storing buffers 63*b* and 63*c* (interruption information storing buffers E and F in FIG. 2) for the first device controller which store the first interruption information output from the external devices 21 and 22 of the image forming unit 2. The number of interruption information storing buffers for the first device controller that are provided (interruption information storing buffers 63*b* and 63*c*) corresponds to the number of external devices that are connected to the first device controller 41 (external devices 21 and 22) (two in the example illustrated in FIG. 2). Note that, as the first interruption information memory, a memory in which a write area and a read area are specified by addresses may be used.

The external device controller 62 is connected to each of the external devices 21 and 22 that constitute the image forming unit 2 of the image forming apparatus 1, and controls driving of the external devices 21 and 22. When data for controlling a device is written to an output register of an input/output control register group not illustrated, the external device controller 62 outputs a driving signal corresponding to the data to the external device 21 or 22 that corresponds to the output register. Then, the external device 21 or 22 is driven in accordance with the output driving signal. When a signal that indicates the state of the external device 21 or 22 that is connected to the external device controller 62 is input from the external device 21 or 22, the external device controller 62 writes data corresponding to the signal to an input register for the data indicating the state of the external device 21 or 22. When a signal that indicates an interruption state is input from the external device 21 or 22 that is connected to the external device controller 62, the external device controller 62 writes data (interruption information) corresponding to the signal that indicates an interruption state to the interruption information storing buffer 63*b* or 63*c*. Data that indicates the state of the external device 21 or 22 may be, if the external device 21 or 22 is a sensor, data that indicates a detection result from the sensor, or may be, if the external device 21 or 22 is a motor, data that indicates the rotation state of the motor.

When the first interruption controller 61 receives an interruption signal that is input from the second device controller 42 via the signal line 45, the first interruption controller 61 reads, via the serial bus 44, data (interruption information) corresponding to the signal indicating an interruption state of any of the external devices 31 to 34 that are connected to the second device controller 42 and writes the data to the interruption information storing buffer 63*a* for the second device controller. Examples of information that indicates an interruption state include information about a jam which indicates that a sheet detection sensor does not detect, within a predetermined period, a recording sheet passing through, and information about a failure of the sensor itself.

The synchronization signal controller/timer controller 78 receives a synchronization signal that is input from the second device controller 42 via the signal line 49, and controls a synchronization process on the basis of the synchronization signal. The synchronization signal controller/timer controller 78 controls the timing at which a synchronization process is to be performed upon reception of a synchronization signal, on the basis of register values stored in registers of the register storing unit 79. Here, examples of a synchronization signal include a signal that is output in synchronization with an interruption signal input from the second device controller 42 via the signal line 45. In a case where the interruption signal is formed of a page sync signal, the synchronization signal corresponds to a signal that rises in synchronization with the page sync signal, is output in accordance with the length of the recording sheet, and is transmitted in order to communicate the read timing of the signal to the first device controller 41, for example.

Figure 4:
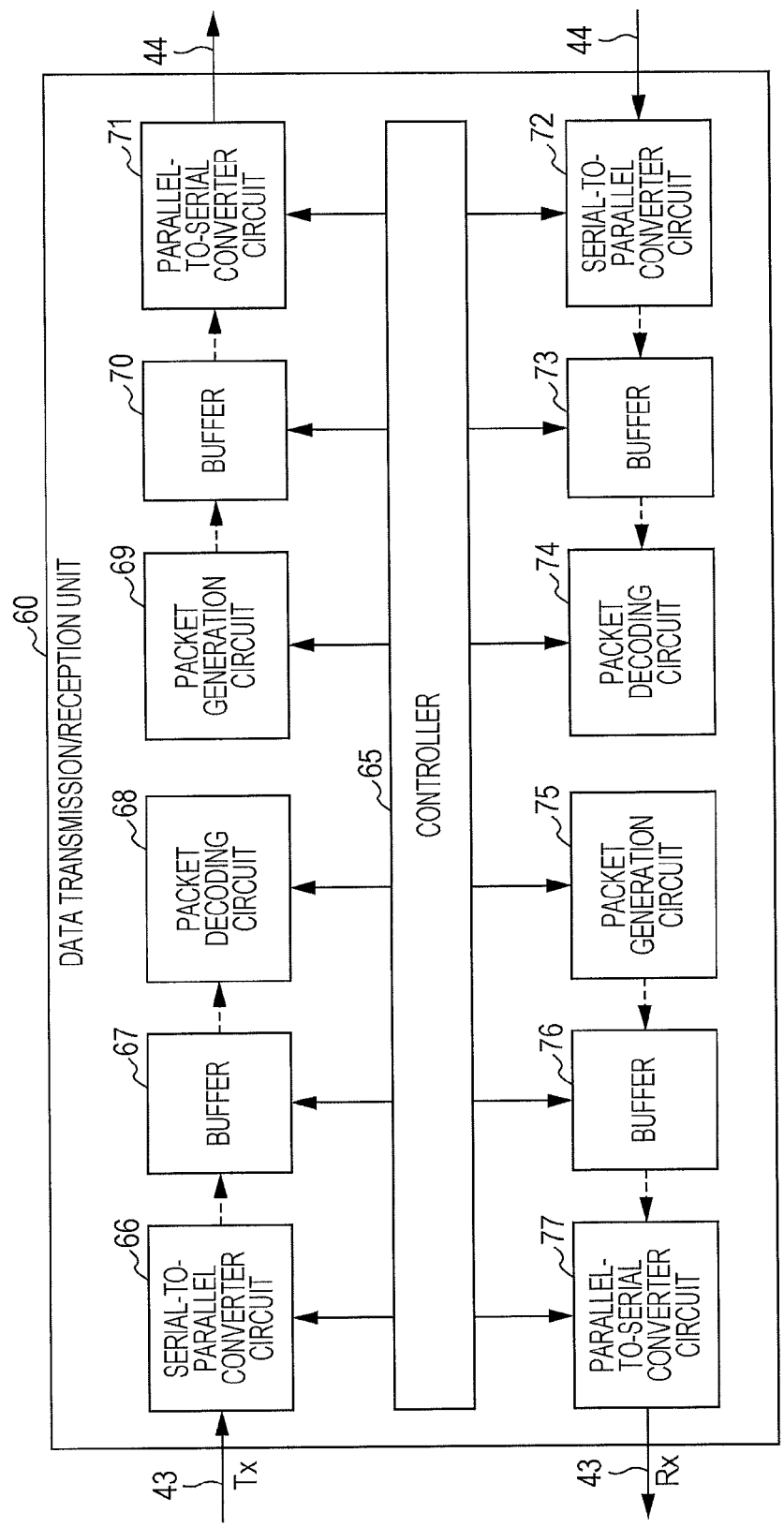
FIG. 4 is a block diagram illustrating a data transmission/reception unit of a first device controller.

The data transmission/reception unit 60 includes a controller 65, a serial-to-parallel converter circuit 66 for receiving a control signal from the master controller 40 via the serial bus 43, a buffer 67, a packet decoding circuit 68, a packet generation circuit 69 for transmitting a control signal to the second device controller 42, a buffer 70, a parallel-to-serial converter circuit 71, a serial-to-parallel converter circuit 72 for receiving data from the second device controller 42 via the serial bus 44, a buffer 73, a packet decoding circuit 74, a packet generation circuit 75 for transmitting data to the master controller 40 via the serial bus 43, a buffer 76, and a parallel-to-serial converter circuit 77, as illustrated in FIG. 4.

The controller 65 is connected to the above-described constituent components and entirely controls the data transmission/reception unit 60 by performing protocol control or controlling operation timings and the like of the constituent components.

The serial-to-parallel converter circuit 66 converts packets in a serial format received from the master controller 40 via the serial bus 43 into packets in a parallel format. The buffer 67 temporarily stores the packets in a parallel format converted by the serial-to-parallel converter circuit 66. The packet decoding circuit 68 decodes the packets in a parallel format temporarily stored in the buffer 67, and extracts data contained in the packets.

The packet generation circuit 69 generates packets to be transmitted to the second device controller 42. The buffer 70 temporarily stores the packets generated by the packet generation circuit 69. The parallel-to-serial converter circuit 71 converts the packets in a parallel format temporarily stored in the buffer 70 into packets in a serial format, and transmits the converted packets to the second device controller 42 via the serial bus 44.

The serial-to-parallel converter circuit 72 converts packets in a serial format received from the second device controller 42 via the serial bus 44 into packets in a parallel format. The buffer 73 temporarily stores the packets in a parallel format converted by the serial-to-parallel converter circuit 72. The packet decoding circuit 74 decodes the packets in a parallel format temporarily stored in the buffer 73, and extracts data contained in the packets.

The packet generation circuit 75 generates packets to be transmitted to the master controller 40 via the serial bus 43. The buffer 76 temporarily stores the packets generated by the packet generation circuit 75. The parallel-to-serial converter circuit 77 converts the packets in a parallel format temporarily stored in the buffer 76 into packets in a serial format, and transmits the converted packets to the master controller 40 via the serial bus 43.

Data that is stored in the interruption information storing buffer 63a and that indicates an occurrence of an interruption is transmitted from the second device controller 42. The data that is transmitted from the second device controller 42 and that indicates an occurrence of an interruption is converted by the parallel-to-serial converter circuit 77 into packets in a serial format, and the packets are transmitted to the master controller 40 in a similar manner to data that is generated within the first device controller 41 and that indicates an occurrence of an interruption. Data that is stored in the interruption information storing buffer 63a is not limited to data that indicates an occurrence of an interruption and may be other data as described below.

Figure 5:
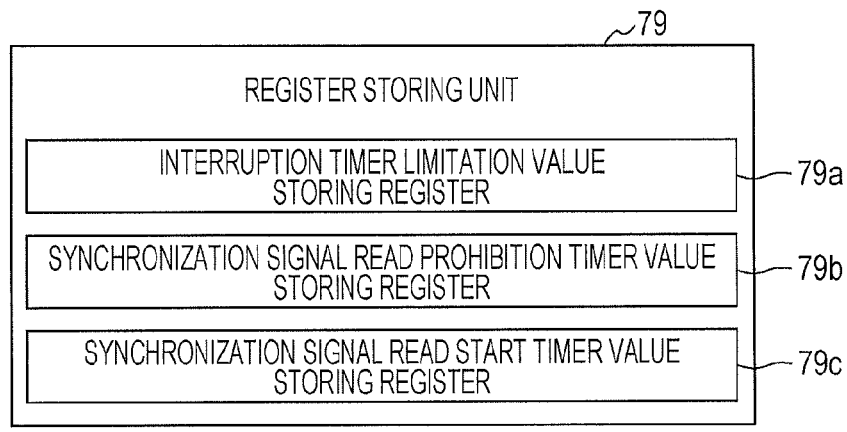
FIG. 5 is a configuration diagram illustrating a register storing unit.

The register storing unit 79 includes an interruption timer limitation value storing register 79a, a synchronization signal read prohibition timer value storing register 79b, and a synchronization signal read start timer value storing register 79c, as illustrated in FIG. 5. Register values stored in the register storing unit 79 are read by the synchronization signal controller/timer controller 78 to thereby control timers of the synchronization signal controller/timer controller 78. Further, register values stored in the register storing unit 79 are rewritable by the synchronization signal controller/timer controller 78 as appropriate.

Configuration of Second Device Controller

The second device controller 42 includes a data transmission/reception unit 80, a second interruption controller 81, an external device controller 82, plural interruption information storing buffers 83a to 83d (interruption information storing buffers A to D in FIG. 2), and a synchronization signal generator 91, as illustrated in FIG. 2.

When the data transmission/reception unit 80 receives packets in a serial format from the first device controller 41 via the serial bus 44, the data transmission/reception unit 80 converts the received packets into packets in a parallel format, decodes the packets in a parallel format, and extracts data contained in the packets. The data transmission/reception unit 80 separates information (parallel signal) to be transmitted to the first device controller 41 into packets, converts the packets into a serial signal, and transmits the serial signal to the first device controller 41 via the serial bus 44.

When the second interruption controller 81 detects data that indicates an occurrence of an interruption having been written to at least one of the interruption information storing buffers 83a to 83d via the external device controller 82, the second interruption controller 81 generates an interruption signal and transmits the interruption signal to the first device controller 41 via the dedicated signal line 45.

The interruption information storing buffers 83a to 83d function as a second interruption information memory and temporarily store data that indicates an interruption state of the external devices 31 to 34 of the image reading device 3 and that is output from the external devices 31 to 34. The number of interruption information storing buffers that are provided (interruption information storing buffers 83a to 83d) corresponds to the number of external devices that are connected to the second device controller 42 (external devices 31 to 34).

The external device controller 82 is connected to each of the external devices 31 to 34 that constitute the image reading device 3 of the image forming apparatus 1. When data for controlling any device among the external devices 31 to 34 is written to an output register of an input/output control register group not illustrated, the external device controller 82 outputs a driving signal corresponding to the data to the device among the external devices 31 to 34 that corresponds to the output register. Then, the device among the external devices 31 to 34 is driven in accordance with the output driving signal. When a signal that indicates the state of any device among the external devices 31 to 34 that are connected to the external device controller 82 is input from the device among the external devices 31 to 34, the external device controller 82 writes data corresponding to the signal to an input register for the data indicating the state of the device among the external devices 31 to 34. Data that indicates the state of any device among the external devices 31 to 34 may be, if the device is a sensor, data that indicates a detection result from the sensor, or may be, if the device is a motor, data that indicates the rotation state of the motor, for example. Data that indicates the state of any device among the external devices 31 to 34 may be, if the device is an image processing apparatus, data indicating that image data has been prepared.

When data indicating an occurrence of an interruption is written to any of the interruption information storing buffers 83a to 83d, the second interruption controller 81 generates an interruption signal. The generated interruption signal is transmitted by the second interruption controller 81 to the first device controller 41 via the signal line 45. Note that the second interruption controller 81 need not generate an interruption signal in response to detection of data that indicates an occurrence of an interruption having been written to any of the interruption information storing buffers 83a to 83d. The second interruption controller 81 may generate an interruption signal in accordance with a signal (write signal) for writing data indicating an occurrence of an interruption to any of the interruption information storing buffers 83a to 83d via the external device controller 82 (at the same timing as the write signal).

When the synchronization signal generator 91 receives a signal indicating that data indicating an occurrence of an interruption has been written to any of the plural interruption information storing buffers 83a to 83d via the external device controller 82, the synchronization signal generator 91 generates a synchronization signal that is synchronous with the interruption signal. The synchronization signal generator 91 transmits the generated synchronization signal to the first device controller 41 via the dedicated signal line 49.

Figure 6:
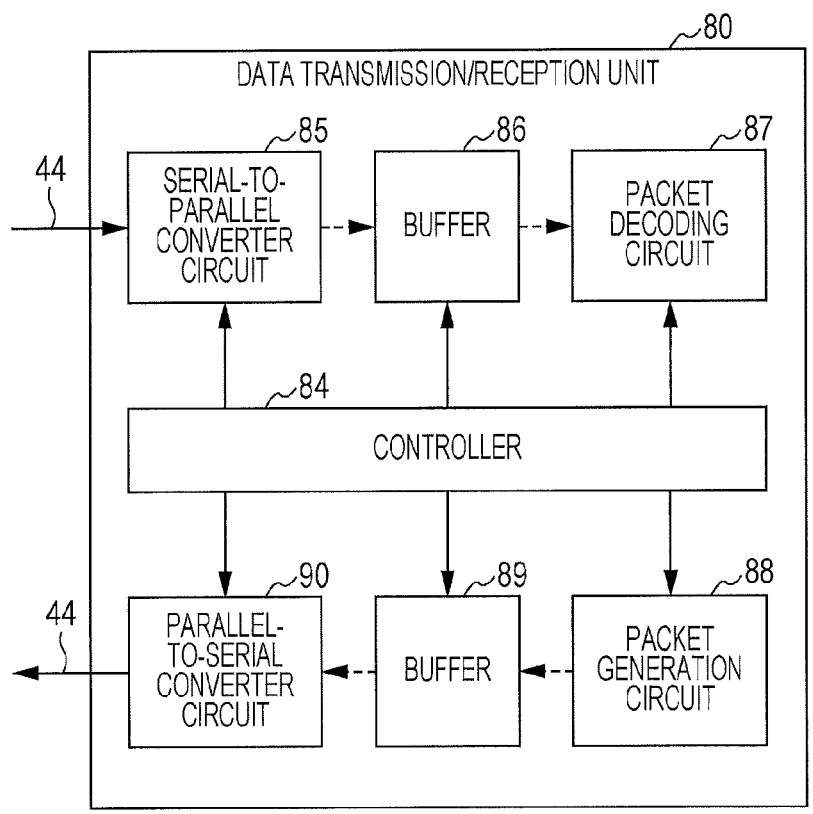
FIG. 6 is a block diagram illustrating a data transmission/reception unit of a second device controller.

The data transmission/reception unit 80 includes a controller 84, a serial-to-parallel converter circuit 85, a buffer 86, a packet decoding circuit 87, a packet generation circuit 88, a buffer 89, and a parallel-to-serial converter circuit 90, as illustrated in FIG. 6.

The controller 84 is connected to the above-described constituent components and entirely controls the data transmission/reception unit 80 by performing protocol control or controlling operation timings and the like of the constituent components.

The serial-to-parallel converter circuit 85 converts packets in a serial format received from the first device controller 41 via the serial bus 44 into packets in a parallel format. The buffer 86 temporarily stores the packets in a parallel format converted by the serial-to-parallel converter circuit 85. The packet decoding circuit 87 decodes the packets in a parallel format temporarily stored in the buffer 86, and extracts data contained in the packets.

The packet generation circuit 88 generates packets to be transmitted to the first device controller 41. The buffer 89 temporarily stores the packets generated by the packet generation circuit 88. The parallel-to-serial converter circuit 90 converts the packets in a parallel format temporarily stored in the buffer 89 into packets in a serial format, and transmits the converted packets to the first device controller 41 via the serial bus 44.

Data that is stored in the interruption information storing buffers 83a to 83d and that indicates an occurrence of an interruption is converted by the parallel-to-serial converter circuit 90 into packets in a serial format, and the packets are transmitted to the first device controller 41.

Note that the data transmission/reception unit 47, the data transmission/reception unit 60, the data transmission/reception unit 80, the external device controller 62, and the external device controller 82 are each constituted by hardware, such as an application specific integrated circuit (ASIC) or a field programmable gate array (FPGA).

Operation of Control Device

The control device 4 according to this exemplary embodiment controls data that indicates an interruption from the image forming unit 2 or the image reading device 3 of the image forming apparatus 1 as described below.

Figure 7:
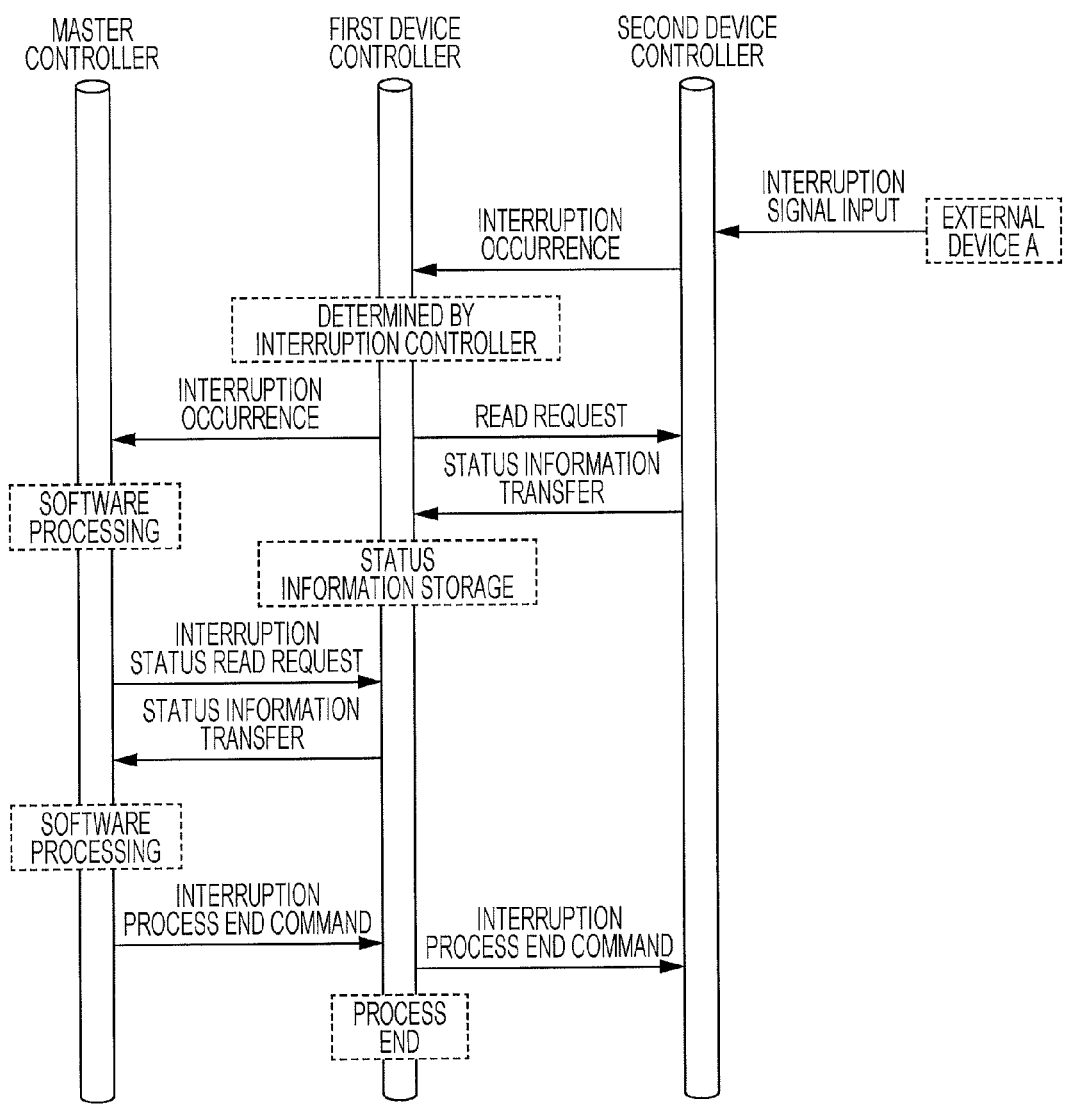
FIG. 7 is a sequence chart illustrating an operation of the control device according to the exemplary embodiment of the present invention.

As illustrated in FIG. 7, in the second device controller 42, when the external device controller 82 detects data that indicates an interruption having been written to the interruption information storing buffer 83a by any of the second external devices 31 to 34, for example, by the second external device 31 (external device A in FIG. 7) connected to the second device controller 42, the external device controller 82 transmits, to the second interruption controller 81, a signal indicating that the data indicating an interruption has been written, and simultaneously transmits the signal to the synchronization signal generator 91. Then, the second interruption controller 81 generates a second interruption signal and transmits the second interruption signal to the first interruption controller 61 of the first device controller 41 via the dedicated signal line 45. The synchronization signal generator 91 generates a synchronization signal that is synchronous with the second interruption signal, and transmits the synchronization signal to the synchronization signal controller/timer controller 78 of the first device controller 41 via the dedicated signal line 49.

When the first interruption controller 61 of the first device controller 41 receives the second interruption signal, the first interruption controller 61 transmits packets corresponding to the interruption signal to the master controller 40 via the data transmission/reception unit 60 to thereby notify the master controller 40 of the occurrence of an interruption, as illustrated in FIG. 7.

At this time, in the data transmission/reception unit 60, packet signals corresponding to the interruption signal are generated by the packet generation circuit 75, the packet signals are temporarily stored in the buffer 76, the packet signals are converted into a serial signal by the parallel-to-serial converter circuit 77, and packets corresponding to the interruption signal are transmitted to the master controller 40 via the serial bus 43, as illustrated in FIG. 4.

In this case, the first interruption controller 61 of the first device controller 41 transmits packets corresponding to the interruption signal to the master controller 40 and simultaneously transmits, to the second device controller 42 via the data transmission/reception unit 60, packets (read request signal) for reading the data that indicates an interruption and that has been written to any of the interruption information storing buffers 83a to 83d, as illustrated in FIG. 7.

When the data transmission/reception unit 80 of the second device controller 42 receives the packets (read request signal), the data transmission/reception unit 80 decodes the read request signal, reads the data indicating an interruption from a corresponding one of the interruption information storing buffers 83a to 83d, and transmits (transfers) status information to the first device controller 41 via the serial bus 44, as illustrated in FIG. 6.

The data transmission/reception unit 60 writes and stores the status information received from the second device controller 42 in the interruption information storing buffer 63a for the second device controller.

When the master controller 40 receives the packets corresponding to the interruption signal via the serial bus 43, the master controller 40 performs software processing on the basis of the packets and transmits (transfers) a read request signal for reading the status information for interruption to the first device controller 41 via the serial bus 43, as illustrated in FIG. 7.

When the first device controller 41 receives, from the master controller 40, the read request signal for reading the status information for interruption, the first device controller 41 reads the status information written to the interruption information storing buffer 63a for the second device controller and immediately transfers the status information to the master controller 40.

When the master controller 40 reads the status information for interruption from the first device controller 41, the master controller 40 performs software processing on the basis of the status information and transmits an interruption process end command to the first device controller 41, as illustrated in FIG. 7.

The first device controller 41 transmits (transfers) the interruption process end command received from the master controller 40 to the second device controller 42, and the second device controller 42 performs a process so as to resolve the interruption state on the basis of the interruption process end command.

On the other hand, in the first device controller 41, when the synchronization signal controller/timer controller 78 receives a synchronization signal transmitted from the second device controller 42, as illustrated in FIG. 2, the synchronization signal controller/timer controller 78 reads a register value stored in the synchronization signal read prohibition timer value storing register 79b of the register storing unit 79 and starts counting an elapsed time corresponding to the register value, as illustrated in FIG. 2 and FIG. 8.

When the synchronization signal controller/timer controller 78 finishes counting the elapsed time corresponding to the register value stored in the synchronization signal read prohibition timer value storing register 79b, the synchronization signal controller/timer controller 78 reads a register value stored in the synchronization signal read start timer value storing register 79c of the register storing unit 79 and starts counting an elapsed time corresponding to the register value, as illustrated in FIG. 8.

Here, the register value stored in the synchronization signal read prohibition timer value storing register 79b is set to a time needed for the first device controller 41 to read the status information written to the interruption information storing buffer 63a for the second device controller on the basis of the interruption signal and to transfer the status information to the master controller 40, as illustrated in FIG. 7.

Therefore, the interruption information storing buffer 63a for the second device controller is used as an area for which reading status information therefrom on the basis of an interruption signal is allowed over the period from A to B, as illustrated in FIG. 8. Thereafter, the interruption information storing buffer 63a for the second device controller becomes an area for which reading information therefrom on the basis of an interruption signal is prohibited until the next interruption signal is input, namely, over the period C. Accordingly, when the interruption information storing buffer 63a for the second device controller is used as a read-prohibited area over the period C, reading information therefrom on the basis of an interruption signal is prohibited.

On the other hand, the interruption information storing buffer 63a for the second device controller becomes a read-allowed area after the period from D to E over which reading on the basis of a synchronization signal has been prohibited until the time G at which the master controller 40 is needed for processing, namely, over the period F, as illustrated in FIG. 8.

Therefore, the interruption information storing buffer 63a for the second device controller is in a state where reading information therefrom on the basis of a synchronization signal is allowed over the read-allowed period F. In this case, the interruption information storing buffer 63a for the second device controller is in a state where writing information prior to reading information is also allowed over the read-allowed period F. Accordingly, although the interruption information storing buffer 63a for the second device controller is one storage section, the interruption information storing buffer 63a for the second device controller enables writing thereto and reading therefrom two types of data by making the period of writing and reading differ between the two types of data, as illustrated in FIG. 8.

As information that is stored in the interruption information storing buffer 63a for the second device controller on the basis of a synchronization signal, it is possible to use various types of information relating to a synchronization signal.

As described in the above exemplary embodiment, even in a case where an interruption state occurs in any of the external devices 31 to 34 that are connected to the second device controller 42, an interruption signal transmitted from the second device controller 42 is transmitted to the master controller 40, and data that indicates the interruption state and that has been transmitted from the second device controller 42 is stored in the interruption information storing buffer 63a for the second device controller that is provided to the first device controller 41 before the master controller 40 attempts to read the data that indicates the interruption and that is stored in the interruption information storing buffer 63a provided to the first device controller 41.

Accordingly, the master controller 40 is able to read data indicating an interruption even if the data is from the second device controller 42 secondly connected to the master controller 40 via the first device controller 41 with little delay compared to data indicating an interruption transmitted from the first device controller 41, and to respond to the interruption, which results in an improved real-time property.

In the exemplary embodiment described above, although the case is described where the second device controller 42 is connected to the master controller 40 via the first device controller 41, a third device controller may be further connected via the second device controller 42. In this case, the second device controller 42 may be configured to include a memory that stores interruption information from the subsequent third device controller in a similar manner to the first device controller 41.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A control device comprising:
   a second sub-controller to which one or more second devices are connected, the second sub-controller including
      a second interruption information memory that stores second interruption information output from the second devices,
      a second interruption controller that transmits an interruption signal upon storing of the second interruption information in the second interruption information memory, and reads and transmits the second interruption information stored in the second interruption information memory, and
      a synchronization signal generator that transmits a synchronization signal which is synchronous with the interruption signal;
   a first sub-controller to which one or more first devices are connected, the first sub-controller including
      a first interruption information memory that stores first interruption information output from the first devices, and the second interruption information transmitted from the second sub-controller,
      a first interruption controller that transmits the interruption signal received from the second sub-controller, and reads and transmits the first interruption information and the second interruption information stored in the first interruption information memory, and
      a synchronization signal controller that controls a storage operation of the first interruption information memory in accordance with the synchronization signal;
   a master controller that controls the first sub-controller and the second sub-controller;
   a full-duplex serial bus that connects the master controller and the first sub-controller to each other;
   a full-duplex serial or parallel bus that connects the first sub-controller and the second sub-controller to each other;
   a unidirectional transmission line that is used to transmit the interruption signal from the second sub-controller to the first sub-controller; and
   a unidirectional transmission line that is used to transmit the synchronization signal from the second sub-controller to the first sub-controller.

2. The control device according to claim 1, wherein
   the second sub-controller transmits the second interruption information to the first sub-controller via the full-duplex serial or parallel bus.

3. The control device according to claim 2, wherein
the first sub-controller transmits the interruption signal received from the second sub-controller to the master controller via the full-duplex serial bus.

4. The control device according to claim 3, wherein
the master controller reads the first interruption information or the second interruption information stored in the first interruption information memory upon reception of the interruption signal from the first sub-controller.

5. The control device according to claim 2, wherein
the master controller reads the first interruption information or the second interruption information stored in the first interruption information memory upon reception of the interruption signal from the first sub-controller.

6. The control device according to claim 1, wherein
the first sub-controller transmits the interruption signal received from the second sub-controller to the master controller via the full-duplex serial bus.

7. The control device according to claim 6, wherein
the master controller reads the first interruption information or the second interruption information stored in the first interruption information memory upon reception of the interruption signal from the first sub-controller.

8. The control device according to claim 1, wherein
the master controller reads the first interruption information or the second interruption information stored in the first interruption information memory upon reception of the interruption signal from the first sub-controller.

9. An image forming apparatus comprising:
an image forming unit that forms an image on a recording medium by using image information; and
a control device that controls the image forming unit, wherein
the control device according to claim 1 is used as the control device that controls the image forming unit.

10. An image forming apparatus comprising:
an image reading unit that reads an image of a document;
an image forming unit that forms an image on a recording medium by using image information obtained by the image reading unit; and
a control device that controls the image reading unit and the image forming unit, wherein
the control device according to claim 1 is used as the control device that controls the image reading unit and the image forming unit.

11. The image forming apparatus according to claim 10, wherein
the image forming unit is connected to the control device, and
the image reading unit is connected to the image forming unit.

12. A control method comprising:
storing, in a second interruption information memory included in a second sub-controller, second interruption information output from one or more second devices that are connected to the second sub-controller;
transmitting, from a second interruption controller included in the second sub-controller, an interruption signal upon storing of the second interruption information in the second interruption information memory, and reading and transmitting the second interruption information stored in the second interruption information memory from the second interruption controller;
transmitting a synchronization signal that is synchronous with the interruption signal from a synchronization signal generator included in the second sub-controller;
storing, in a first interruption information memory included in a first sub-controller, first interruption information output from one or more first devices that are connected to the first sub-controller, and the second interruption information transmitted from the second sub-controller;
transmitting, from a first interruption controller included in the first sub-controller, the interruption signal received from the second sub-controller, and reading and transmitting the first interruption information and the second interruption information stored in the first interruption information memory from the first interruption controller; and
controlling, in a synchronization signal controller included in the first sub-controller, a storage operation of the first interruption information memory in accordance with the synchronization signal, wherein
the first sub-controller and the second sub-controller are controlled by a master controller,
the master controller and the first sub-controller are connected to each other by a full-duplex serial bus,
the first sub-controller and the second sub-controller are connected to each other by a full-duplex serial or parallel bus,
the interruption signal is transmitted from the second sub-controller to the first sub-controller by using a unidirectional transmission line, and
the synchronization signal is transmitted from the second sub-controller to the first sub-controller by using another unidirectional transmission line.

* * * * *